United States Patent
Yoshiga et al.

(10) Patent No.: US 12,459,410 B2
(45) Date of Patent: Nov. 4, 2025

(54) SEATBACK OF VEHICLE SEAT

(71) Applicants: NHK SPRING CO., LTD., Yokohama (JP); SUBARU CORPORATION, Tokyo (JP)

(72) Inventors: Kensuke Yoshiga, Yokohama (JP); Hiroki Jineda, Yokohama (JP); Mitsutoshi Saito, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 177 days.

(21) Appl. No.: 18/518,180

(22) Filed: Nov. 22, 2023

(65) Prior Publication Data
US 2024/0174147 A1 May 30, 2024

(30) Foreign Application Priority Data
Nov. 30, 2022 (JP) ................................. 2022-191605

(51) Int. Cl.
*B60N 2/66* (2006.01)
(52) U.S. Cl.
CPC ....................................... *B60N 2/66* (2013.01)
(58) Field of Classification Search
CPC ........................................................ B60N 2/66
See application file for complete search history.

(56) References Cited

U.S. PATENT DOCUMENTS

| | | | | |
|---|---|---|---|---|
| 4,832,400 A | * | 5/1989 | Aoki ........................ | B60N 2/66 297/284.4 |
| 5,295,732 A | * | 3/1994 | Boisset ................ | B60N 2/5825 297/228.1 |
| 7,673,939 B2 | * | 3/2010 | Taguchi .................... | B60N 2/72 297/218.4 |
| 9,045,063 B2 | * | 6/2015 | Line ........................ | B60N 2/99 |
| 9,193,289 B2 | * | 11/2015 | Takahashi ............ | B60N 2/7094 |
| 2013/0341981 A1 | | 12/2013 | Arakawa et al. | |
| 2019/0039486 A1 | * | 2/2019 | Wright ...................... | B60N 2/66 |

FOREIGN PATENT DOCUMENTS

| | | |
|---|---|---|
| JP | 2014-004927 A | 1/2014 |
| JP | 2017-100584 A | 6/2017 |

* cited by examiner

*Primary Examiner* — Anthony D Barfield
(74) *Attorney, Agent, or Firm* — Knobbe, Martens, Olson & Bear, LLP

(57) ABSTRACT

A seatback of a vehicle seat, including: a cushion member including a central section, and a pair of side sections respectively connected to a pair of side edge portions of the central section so as to be rotatable relative to the central section; a lumbar support configured to contact a rear face of the central section and to be deformable such that a front-rear direction position of part of the lumbar support is changed; a covering member having a bag shape and covering the cushion member and the lumbar support; a pair of side restraint members configured so as to be connected to an inner face of the covering member and to respectively restrain the pair of side sections; and a pair of back face restraint members provided at an inner face of a back face configuration section of the covering member and connected to the side restraint members.

5 Claims, 11 Drawing Sheets

SEATBACK OF VEHICLE SEAT

CROSS-REFERENCE TO RELATED APPLICATION

This application is based on and claims priority under 35 USC 119 from Japanese Patent Application No. 2022-191605 filed on Nov. 30, 2022, the entire disclosure of which is incorporated by reference herein.

BACKGROUND

Technical Field

The present disclosure relates to a seatback of a vehicle seat.

Related Art

A vehicle seat is disclosed in Japanese Patent Application Laid-Open (JP-A) No. 2014-004927. A seatback of this vehicle seat includes a cushion member supported by a seatback frame, a lumbar support supported by the seatback frame, a drive device that changes a shape of the lumbar support, and a bag shaped covering member that covers the cushion member and the lumbar support. When force generated by the drive device is imparted to the lumbar support, part of the lumbar support deforms so as to be positioned further toward a front side than other sites thereon.

When the shape of the lumbar support has changed, there is a concern that the shape of a back face configuration section of the covering member does not conform to the shape change of the lumbar support, and that a large gap may be formed between the lumbar support and the back face configuration section.

SUMMARY

The present disclosure provides a seatback of a vehicle seat configured such that a large gap is not liable to be formed between a back face configuration section of a covering member and a lumbar support when the shape of the lumbar support has been changed so as to position part of the lumbar support further toward a front side than other sites thereon.

A seatback of a vehicle seat according to a first aspect of the present disclosure includes a cushion member, a lumbar support, a covering member, a pair of side restraint members, and a pair of back face restraint members. The cushion member includes a seat width direction central section, and a pair of side sections respectively connected to a pair of side edge portions of the central section so as to be rotatable relative to the central section about the side edge portions. The lumbar support is configured to contact a rear face of the central section and to be deformable such that a front-rear direction position of part of the lumbar support is changed. The covering member has a bag shape and covers the cushion member and the lumbar support. The pair of side restraint members is configured so as to be connected to an inner face of the covering member and to respectively restrain the pair of side sections. The pair of back face restraint members is provided at an inner face of a back face configuration section of the covering member and, by being respectively connected to the pair of side restraint members, is configured to cause the back face configuration section to approach closer to the lumbar support than would be the case were they not to be connected to the side restraint members.

The cushion member receives force from the lumbar support when part of the lumbar support of the seatback of the first aspect is moved forward, such that the two side sections of the cushion member attempt to rotate with respect to the central section. However, the pair of side restraint members connected to the inner face of the covering member respectively restrain the pair of side sections. Furthermore, the pair of back face restraint members provided to the inner face of the back face configuration section of the covering member are respectively connected to the pair of side restraint members. This means that each of the side sections is not liable to rotate relative to the central section when part of the lumbar support has been moved forward.

Furthermore, when the pair of back face restraint members are respectively connected to the pair of side restraint members, the back face configuration section is caused to approach closer to the lumbar support than were the pair of back face restraint members not to be connected to the side restraint members. This means that a large gap is not liable to be formed between the back face configuration section of the covering member and the lumbar support when the shape of the lumbar support has been changed so as to position part of the lumbar support further toward a front side than other sites thereon.

A seatback of a vehicle seat according to a second aspect of the present disclosure is the seatback of the vehicle seat of the first aspect, wherein the back face restraint member on the left side is connected to a right side edge portion of the side restraint member on the left side restraining the side section, and the back face restraint member on the right side is connected to a left side edge portion of the side restraint member on the right side restraining the side section.

In the seatback of the vehicle seat according to the second aspect of the present disclosure, a left-right direction distance between the lumbar support and a connection portion of the corresponding left-right back face restraint member to the side restraint member is shorter than a comparative example in which the back face restraint member on the left side is connected to the left side edge portion of the side restraint member on the left side restraining the side section, and the back face restraint member on the right side is connected to the right side edge portion of the side restraint member on the right side restraining the side section. This means that a large gap is less liable to be formed between the back face configuration section of the covering member and the lumbar support in the seatback of the vehicle seat of the second aspect of the present disclosure than in the comparative example mentioned above.

A seatback of the vehicle seat according to the third aspect of the present disclosure is the seatback of the vehicle seat of the first aspect or the second aspect, wherein first recesses are provided at a rear face of the central section and are positioned between the pair of side sections and house the lumbar support, and connection portions between the left-right back face restraint members and the side restraint members are positioned in the respective first recesses.

In the seatback of the vehicle seat according to the third aspect of the present disclosure, the connection portions between the left-right back face restraint members and the side restraint members are positioned in the respective first recesses. This means that there is little concern that part of the back face configuration section of the covering member might bulge toward the outside due to these connection portions contacting the inner face of the back face configuration section.

A seatback of a vehicle seat according to a fourth aspect of the present disclosure is the seatback of the vehicle seat of the first aspect or the second aspect, wherein the left-right pair of through holes are provided to the central section so as to penetrate the central section, and the side restraint members each include a first restraint member having one end portion connected to the inner face of the covering member and having another end portion provided with a first engaging portion, and a second restraint member having one end portion connected to the inner face of the covering member and provided with a second engaging portion engageable with the first engaging portion at another end portion. The first engaging portions of the first restraint members are passed through the through holes toward the rear from in front of the cushion member, and are engaged with the second engaging portions of the second restraint members that contact a rear face of the side section.

In the seatback of the vehicle seat according to the fourth aspect of the present disclosure, each of the side sections is surrounded by the inner face of the covering member, the first restraint member, and the second restraint member. This means that each of the side sections is not liable to rotate relative to the central section when part of the lumbar support has been moved forward.

A seatback of a vehicle seat according to a fifth aspect of the present disclosure is the seatback of the vehicle seat of the first aspect or the second aspect, wherein a second recess is formed to a rear face of each of the left-right side sections, and the first engaging portions and the second engaging portions are engaged in the second recesses.

In the seatback of the vehicle seat according to the fifth aspect of the present disclosure, the first engaging portions and the second engaging portions are engaged in the second recesses formed in the rear face of the left-right side sections. This means that there is little concern that the first engaging portions and the second engaging portions might contact the inner face of the back face configuration section of the covering member such that part of the back face configuration section is caused to bulge out greatly toward the outside.

As described above, in the seatback of the vehicle seat according to the present disclosure, a large gap is not liable to be formed between the back face configuration section of the covering member and the lumbar support when the shape of the lumbar support has been changed so as to position part of the lumbar support further toward a front side than other sites thereon.

BRIEF DESCRIPTION OF THE DRAWINGS

Exemplary embodiments of the present invention will be described in detail based on the following figures, wherein.

DETAILED DESCRIPTION

Figure 1:
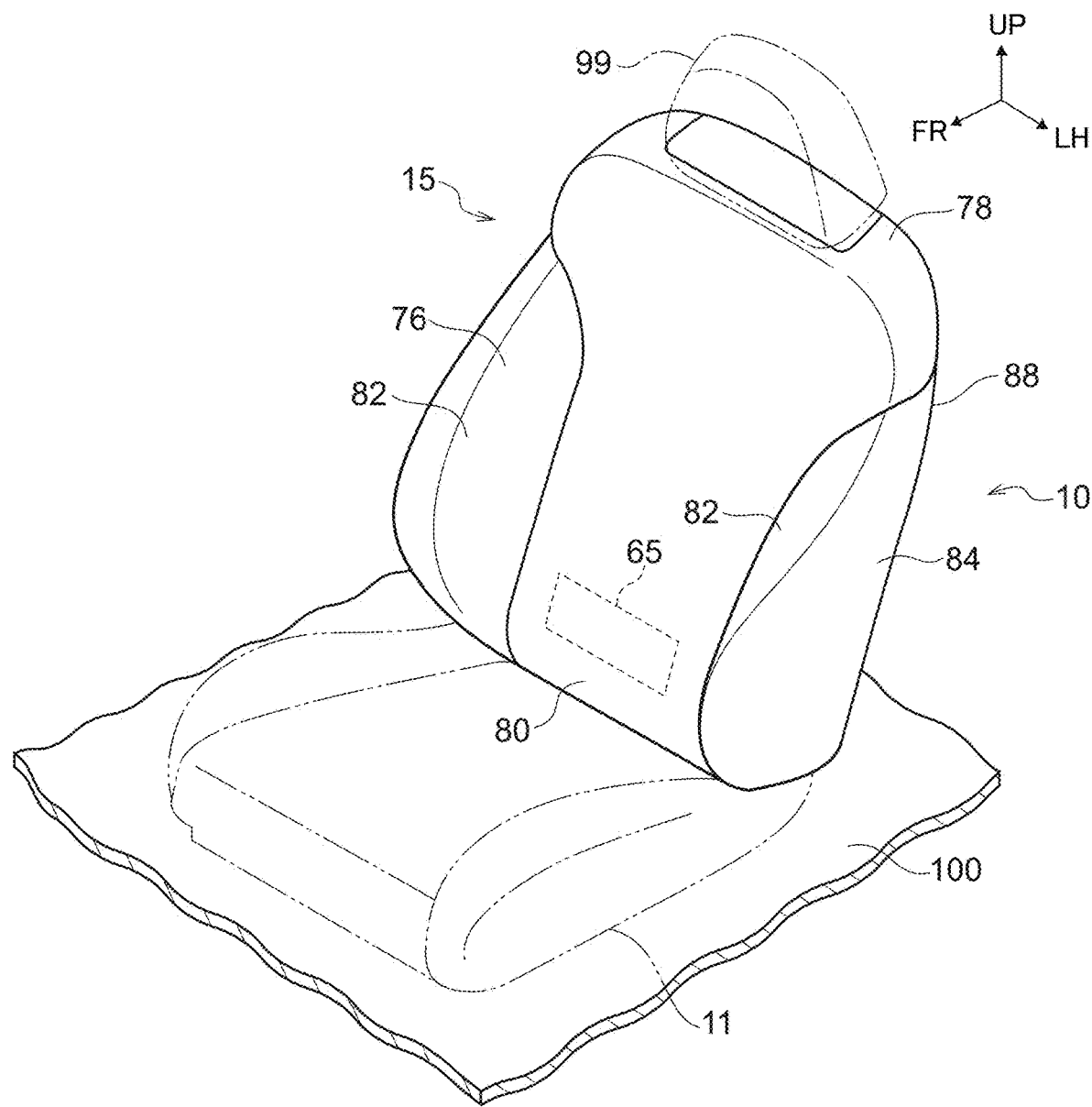
FIG. 1 is a perspective view of a vehicle seat including a seatback according to an exemplary embodiment of the present disclosure.

Explanation follows regarding a vehicle seat 10 (hereafter referred to as seat 10) according to an exemplary embodiment of the present disclosure, with reference to the appended drawings. Note that, as appropriate in the drawings, arrow FR indicates a vehicle front direction, arrow UP indicates a vehicle upward direction, and arrow LH indicates a left side in a vehicle left-right direction (seat width direction). In the following, simple reference in the description to front-rear, left-right, and up-down directions respectively indicate front-rear in a vehicle front-rear direction, left-right in a vehicle left-right direction (seat width direction), and up-down in a vehicle height direction.

The seat 10 illustrated in FIG. 1 is installed to a floor surface 100 of a vehicle cabin of a vehicle. The seat 10 includes a seat cushion 11, a seatback 15 that includes a bottom end portion rotatably connected to a rear end portion of the seat cushion 11, and a headrest 99. The seat cushion 11 is supported by slide rails (omitted in the drawings) installed to the floor surface 100.

The seatback 15 includes a cushion member 20, a seatback frame 50, a lumbar support 60, a drive device 65, a covering member 76, first restraint members (side restraint members) 92, second restraint members (side restraint members) 95, and back face restraint members 97.

Figure 2:
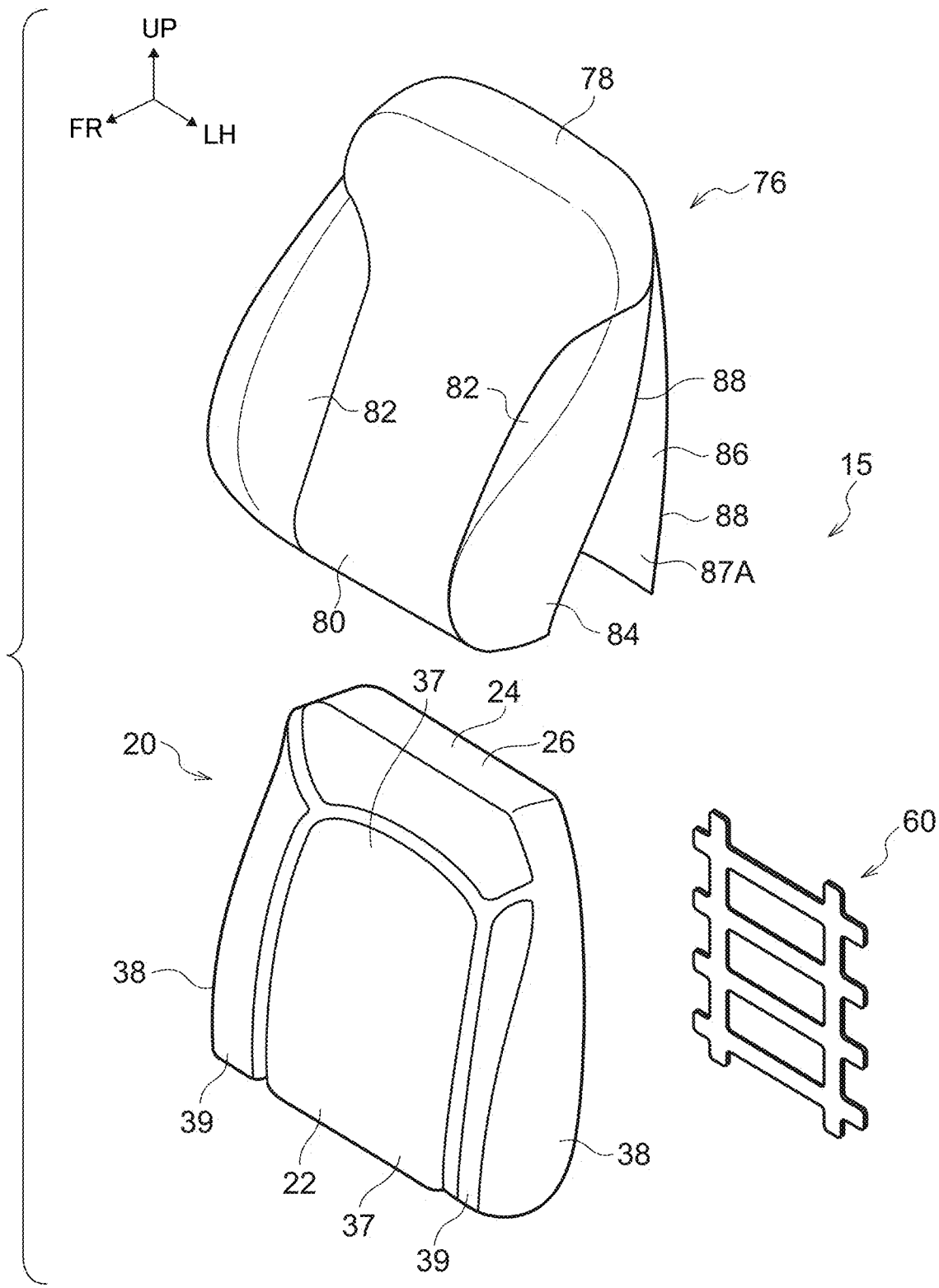
FIG. 2 is an exploded perspective view of a covering member, a cushion member, and a lumbar support as viewed from the front.
Figure 3:
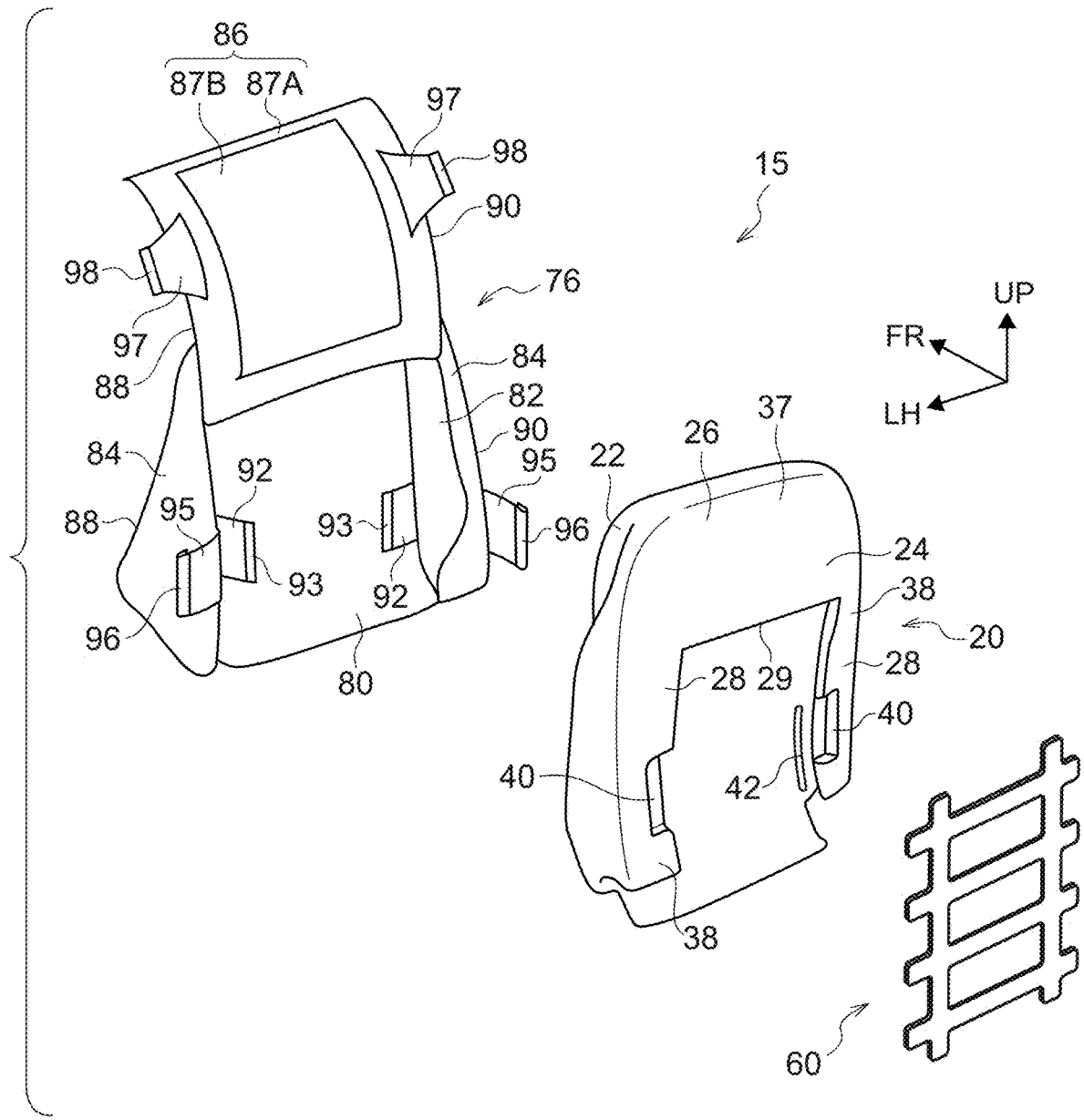
FIG. 3 is an exploded perspective view of a covering member, a cushion member, and a lumbar support as viewed from the rear.
Figure 4:
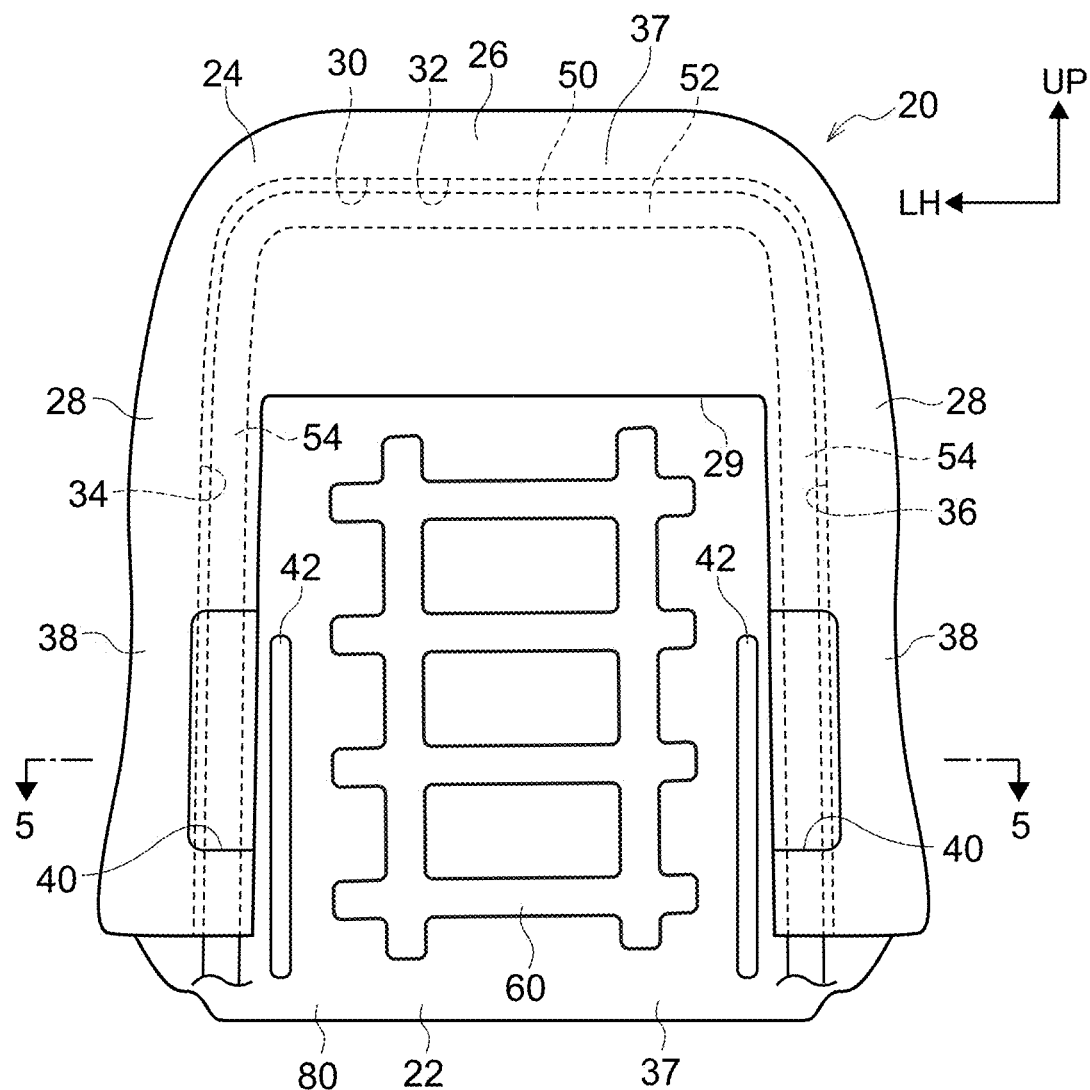
FIG. 4 is a back face view of a cushion member, a seatback frame, and a lumbar support.
Figure 5:
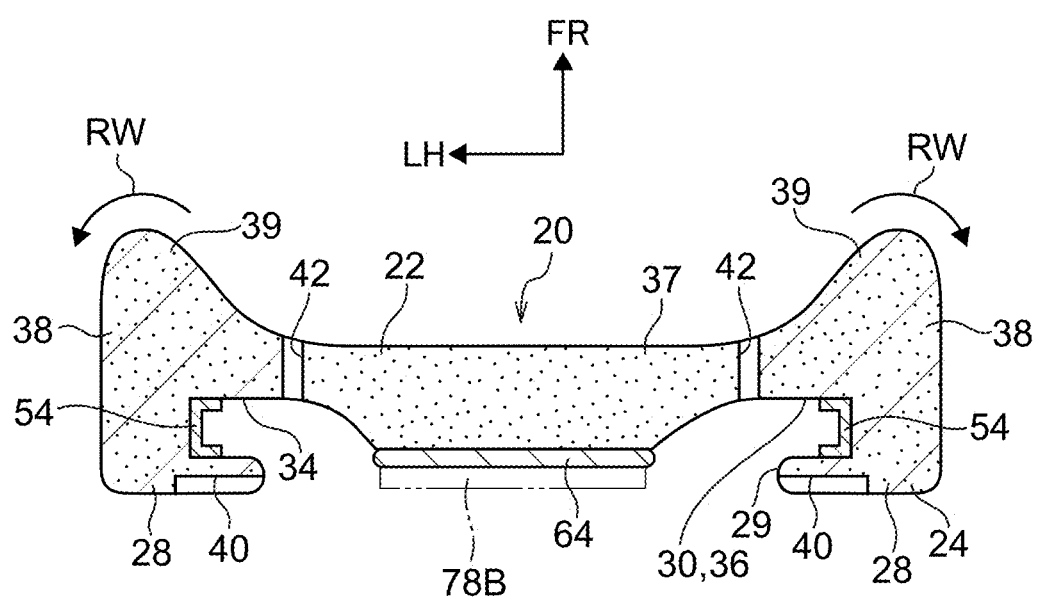
FIG. 5 is a cross-section taken along line 5-5 of FIG. 4.

The cushion member 20 illustrated in FIG. 2 to FIG. 5 is, for example, configured by a polyurethane foam. The cushion member 20 includes a main body 22 and a back face section 24. The back face section 24 configures a rear section of the cushion member 20, the main body 22 configures sites of the cushion member 20 other than on the back face section 24. The back face section 24 includes an upper configuration section 26, and a left-right pair of side configuration sections 28 extending downward from the left-right end portions of the upper configuration section 26. Furthermore, a central recess (first recess) 29 is formed in a rear face of the cushion member 20 at a position between the upper configuration section 26 and the left-right side configuration sections 28. As illustrated in FIG. 4 and FIG. 5, a frame housing space 30 having a substantially U-shape in back face view is formed between a rear face of the main body 22 and the back face section 24. The frame housing space 30 includes an upper space 32 formed between the upper configuration section 26 and a rear face of the main body 22, a left side space 34 formed between a right half of the side configuration section 28 on the left side and the rear face of the main body 22, and a right side space 36 formed between a left half of the side configuration section 28 on the right side and the rear face of the main body 22. Bottom end portions of the left side space 34 and the right side space 36 are open at bottom end faces of the left-right side configuration sections 28.

The cushion member 20 includes a central section 37 and a left-right pair of side sections 38. The central section 37 is configured by a left-right direction central section of the main body 22 and by a left-right direction central section of the upper configuration section 26. The side section 38 on the left side is configured by a left side section of the main body 22, a left end portion of the upper configuration section 26, and the side configuration section 28 on the left side, and the side section 38 on the right side is configured by a right side section of the main body 22, a right end portion of the upper configuration section 26 and the side configuration section 28 on the right side. Moreover, a front portion of the left-right side sections 38 is configured by a bulge portion 39 that protrudes further forward than the central section of the front face of the cushion member 20 (see FIG. 5). The left-right side sections 38 are able to rotate relative to the central section 37 about the respective side edge portions of the central section 37. Back face recesses (second recesses) 40 are formed to a rear face of the respective left-right side configuration sections 28 so as to be open at end portions on the central recess 29 side and rear faces thereof. Furthermore, a left-right pair of slits (through holes) 42 are formed in the main body 22 so as to extend in the height direction. Each of the slits 42 penetrates the main body 22 in the front-rear direction. As illustrated in FIG. 4, the left-right slits 42 are exposed through the central recess 29 when the cushion member 20 is viewed from the rear.

A metal seatback frame 50 serving as a frame member of the seatback 15 includes an upper frame 52 extending in the left-right direction, and a left-right pair of side frames 54 extending downward from the left-right end portions of the upper frame 52. Moreover, the seatback frame 50 also includes a support member (omitted in the drawings) for supporting the lumbar support 60. As illustrated in FIG. 4, the cushion member 20 is fixed to the seatback frame 50 in a state in which the upper frame 52 is inserted into the upper space 32, the side frame 54 on the left side is inserted into the left side space 34, and the side frame 54 on the right side is inserted into the right side space 36. The bottom end portions of the left-right side frames 54 project downward from the bottom ends of the left-right side configuration sections 28.

The lumbar support 60 illustrated in FIG. 2 to FIG. 4 is an integrally molded product made from a rigid resin. The lumbar support 60 is resiliently deformable. The overall shape of the lumbar support 60 is a substantially rectangular shape in face-on view. The lumbar support 60 includes plural sites extending in a straight line shape along the height direction, and plural sites extending in a straight line shape along the left-right direction. The shape of the lumbar support 60 is not limited to the illustrated shape. For example, the lumbar support 60 may be a plate shaped member configuring a substantially rectangular shape in face-on profile. The up-down dimension and left-right dimension of the lumbar support 60 are smaller than those of the central recess 29. The lumbar support 60 is supported by the above mentioned support member in a state positioned inside the central recess 29. Furthermore, at least part of the front face of the lumbar support 60 contacts a rear face of the main body 22 (bottom face of the central recess 29).

The drive device 65 includes an electric actuator and is provided inside the cushion member 20 as illustrated in FIG. 1. A side face profile of the lumbar support 60 changes when a switch member (omitted in the drawings) provided to the seatback 15 is operated and drive force of the electric actuator is transmitted from the drive device 65 to the lumbar support 60. For example, the lumbar support 60 inside the seatback 15 sometimes adopts the shape illustrated in FIG. 2 and FIG. 3. The side face profile of the lumbar support 60 in such cases is a substantially straight line shape. Moreover, the lumbar support 60 inside the seatback 15 sometimes adopts the shape illustrated in FIG. 11 by drive force of the electric actuator being transmitted from the drive device 65 to the lumbar support 60. The side face profile of the lumbar support 60 in such cases is a curved shape having a height direction central section positioned further forward than other sites thereon.

As illustrated in FIG. 1 to FIG. 3, the covering member 76 includes an upper configuration section 78, a front face central configuration section 80, a left-right pair of front face side configuration sections 82, a left-right pair of side face configuration sections 84, and a back face configuration section 86. The back face configuration section 86 includes a base member 87A and a shock absorbing member 87B. An upper edge portion of the base member 87A is connected to a rear edge portion of the upper configuration section 78, and an upper edge portion of the shock absorbing member 87B is connected to an upper portion of an inner face of the base member 87A. The face-on profile of the shock absorbing member 87B in an opened out state is slightly smaller than the face-on profile of the central recess 29 and larger than a face-on profile of the lumbar support 60. An upper edge portion of the front face central configuration section 80 is connected to a front edge portion of the upper configuration section 78, and upper edge portions of the left-right side face configuration sections 84 are connected to left-right side edge portions of the upper configuration section 78. Furthermore, the left-right front face side configuration sections 82 are connected to side edge portions of the front face central configuration section 80 and to front edge portions of the left-right side face configuration sections 84.

The covering member 76 is configured by a flexible material. For example, the upper configuration section 78, the front face central configuration section 80, the left-right pair of front face side configuration sections 82, the left-right pair of side face configuration sections 84, and the base member 87A may be configured from real leather or synthetic leather. The shock absorbing member 87B is, for example, configured from a felt member of greater thickness than that of the base member 87A. First fasteners 88 are provided to a rear edge portion of the side face configuration section 84 on the left side and to a left side edge portion of the base member 87A, and second fasteners 90 are provided to a rear edge portion of the side face configuration section 84 on the right side and to a right side edge portion of the base member 87A.

Figure 6:
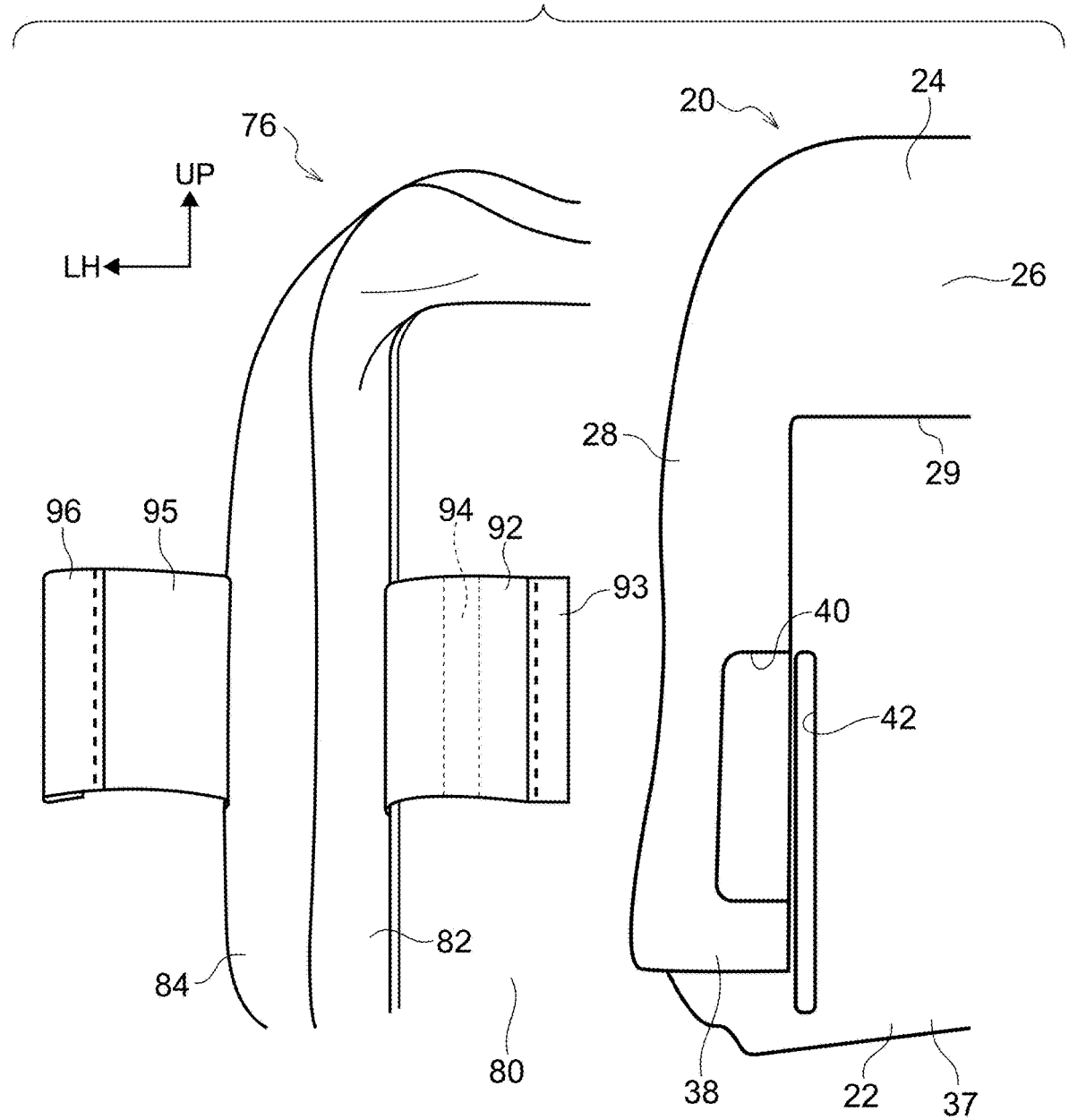
FIG. 6 is a diagram of a covering member and a left side section of a cushion member, separated from each other and viewed from the rear.
Figure 9:
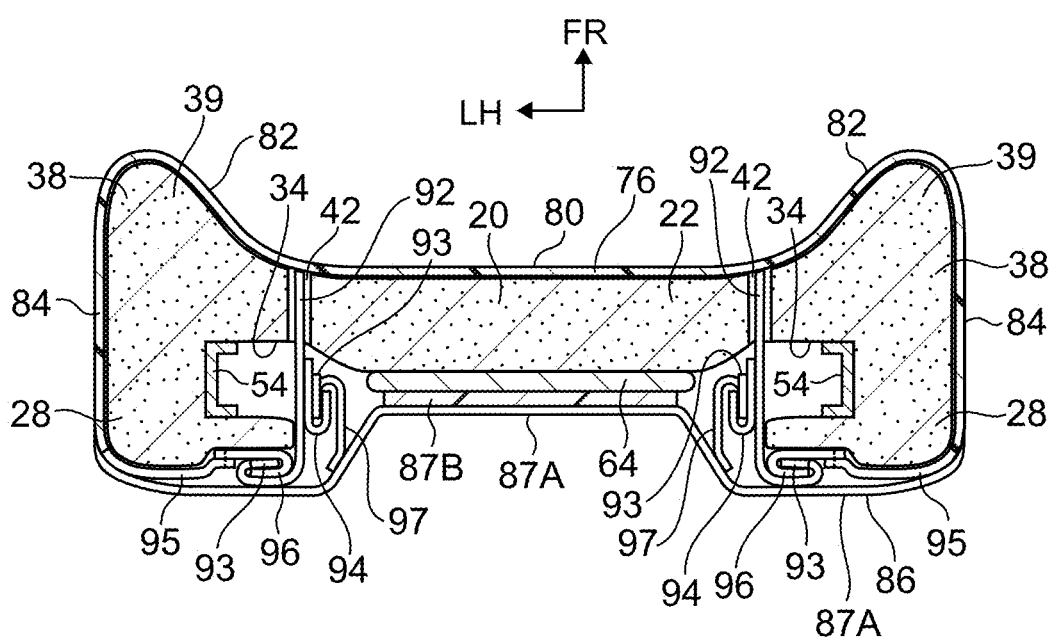
FIG. 9 is a cross-section of a completed seatback corresponding to FIG. 5.
Figure 10:
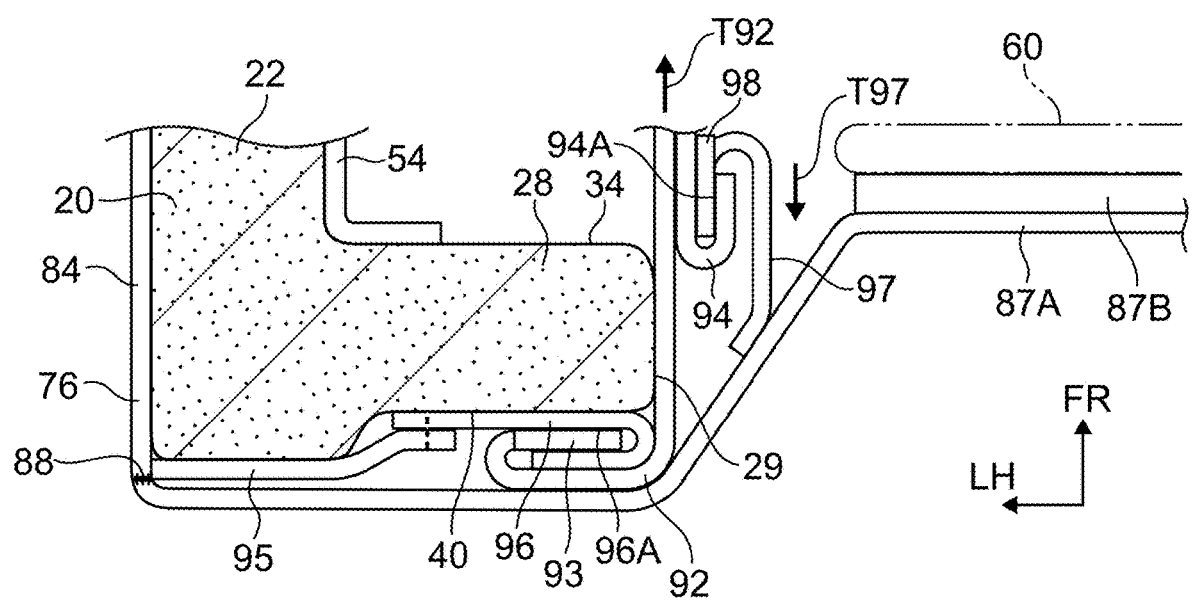
FIG. 10 is an enlarged diagram of part of FIG. 9.

As illustrated in FIG. 3 and FIG. 6, one end portions of first restraint members 92 configured from a left-right pair of cloths are respectively connected to connection portions between the front face central configuration section 80 and the left-right front face side configuration sections 82. The height dimension of each of the first restraint members 92 is shorter than that of the front face side configuration sections 82. Another end portion of each of the first restraint members 92 is fixed to a leading end engaging portion (first engaging portion) 93 configured from a rigid resin. The leading end engaging portion 93 is a plate member having a substantially rectangular shape. Furthermore, one face of each of the first restraint members 92 is fixed to an intermediate engaging portion (connection portion) 94 configured from a rigid resin. As illustrated in FIG. 9 and FIG. 10, the cross-section profile of the intermediate engaging portions 94 is a substantially J-shape. Namely, the intermediate engaging portion 94 includes an engaging groove 94A.

As illustrated in FIG. 3 and FIG. 6, one end portions of second restraint members 95 configured by a left-right pair of cloths are connected to a vicinity of side edge portions (vicinity of rear edge portions) of the inner face of the left-right side face configuration sections 84. The height dimension of each of the second restraint members 95 is shorter than that of the side face configuration sections 84. Engaging portions (second engaging portions) 96 configured from a rigid resin are respectively fixed to another end portions of the second restraint members 95. As illustrated in FIG. 9 and FIG. 10, the cross-section profile of the engaging portions 96 is a substantially J-shape. Namely, the engaging portions 96 each include an engaging groove 96A. The height dimension of the engaging portions 96 is substantially the same as that of the leading end engaging portion 93.

Furthermore, as illustrated in FIG. 3, one end portions of back face restraint members 97 configured by a left-right pair of cloths are respectively connected to left-right two locations on the inner face of the base member 87A. The height dimension of the back face restraint member 97 is shorter than that of the base member 87A. An engaging portion (connection portion) 98 configured from a rigid resin is fixed to the another end portion of each of the back face restraint members 97. The engaging portion 98 is a plate member having a substantially rectangular shape. The height dimension of the engaging portions 98 is substantially the same as that of the intermediate engaging portions 94.

The covering member 76 (the first restraint members 92, the second restraint members 95, the back face restraint member 97) is mounted to the cushion member 20 by the following procedure.

First as illustrated in FIG. 6, an state is adopted in which the first fasteners 88 and the second fasteners 90 of the covering member 76 are separated from the cushion member 20 and opened out. Then the front face central configuration section 80 and the front face side configuration sections 82 of the covering member 76 positioned directly in front of the cushion member 20 are employed to cover the front face of the cushion member 20, and the upper configuration section 78 is employed to cover the upper face of the cushion member 20.

Figure 7:
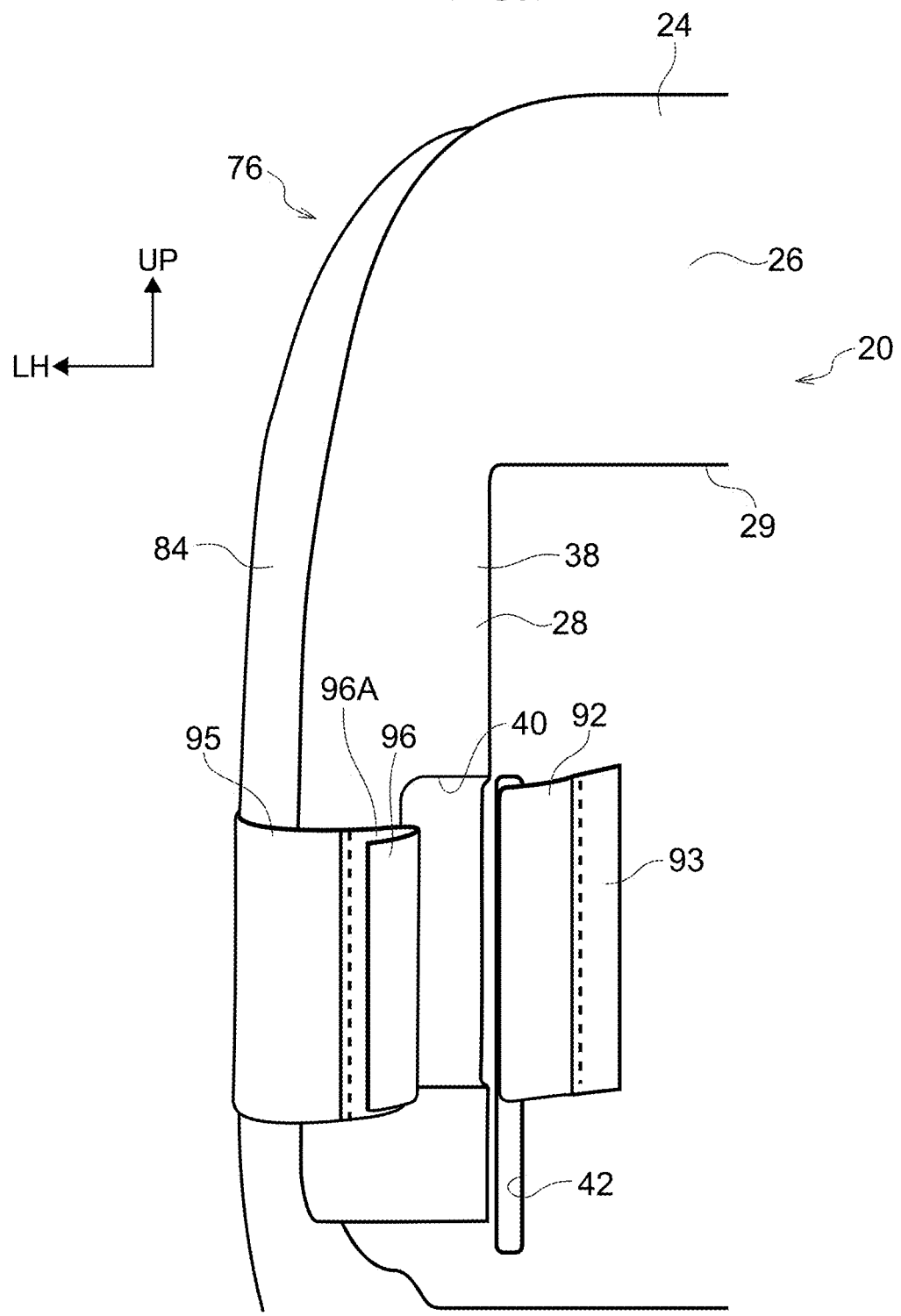
FIG. 7 is a diagram illustrating a situation in which part of a covering member has covered a cushion member and a first restraint member has passed through a slit toward the rear.

Next as illustrated in FIG. 7, the leading end engaging portions 93 of the left-right first restraint members 92 are inserted into the corresponding slits 42 from the front of the main body 22, and part of the leading end engaging portions 93 and the first restraint members 92 are positioned directly behind the main body 22. Furthermore, the left-right second restraint members 95 are caused to approach the outside face and rear face of the corresponding side configuration sections 28.

Figure 8:
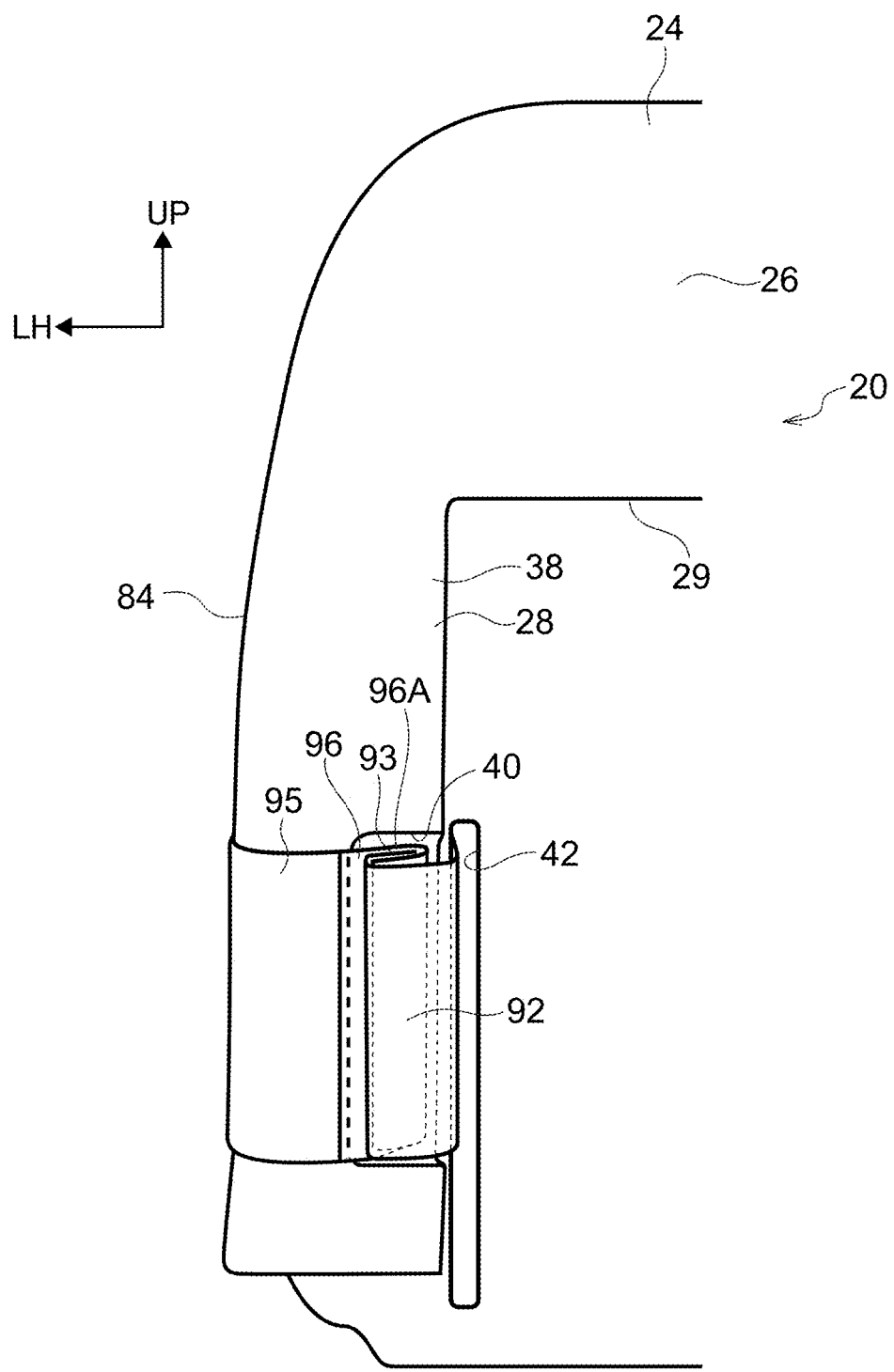
FIG. 8 is a diagram illustrating a situation in which an engaging portion and an engaging portion are connected in a back face recess of a cushion member, as viewed from the rear.

Next, as illustrated in FIG. 8 to FIG. 10, the leading end engaging portions 93 and the engaging portions 96 are engaged with each other in the corresponding back face recesses 40 while the left-right first restraint members 92 and second restraint members 95 are stretched from their natural states. Namely, each of the leading end engaging portions 93 is inserted into the engaging groove 96A of the corresponding engaging portion 96. Thereby as illustrated in FIG. 9 and FIG. 10, each of the front face side configuration sections 82 of the covering member 76 is press welded to a front face of the corresponding side section 38, each of the side face configuration sections 84 is press welded to the outside face of the corresponding side section 38, the second restraint members 95 are each press welded to a rear face of the corresponding side section 38, and each of the first restraint members 92 is press welded to an inner face of the corresponding side section 38. Namely, the covering member 76 (the front face side configuration sections 82 and the side face configuration sections 84), the first restraint members 92 and the second restraint members 95 restrain the corresponding side section 38 while forming a ring shape. The first restraint members 92 generate a forward acting tensional force T92 in this state, as illustrated in FIG. 10.

Next as illustrated in FIG. 9 and FIG. 10, the left-right back face restraint members 97 are stretched from their natural state and each of the engaging portions 98 is engaged with the corresponding intermediate engaging portion 94. Namely, each of the engaging portions 98 is inserted into the engaging groove 94A of the corresponding intermediate engaging portion 94. The intermediate engaging portion 94, the back face restraint member 97, and the engaging portion 98 are positioned in the central recess 29 when this occurs. Namely, the back face restraint member 97 on the left side is connected to the right side edge portion of the first restraint members 92 on the left side, and the back face restraint member 97 on the right side is connected to the left side edge portion of the first restraint members 92 on the right side. Furthermore, the back face restraint members 97 are pulled toward the front by the forward acting tensional force T92 of the first restraint members 92. This means that the shock absorbing member 87B in an opened out state is inserted into the central recess 29 while being move forward, and the shock absorbing member 87B contacts a rear face of the lumbar support 60. Furthermore, a left-right direction central section of the base member 87A contacts a rear face of the shock absorbing member 87B. Moreover, when this occurs the back face restraint member 97 generates a rearward acting tensional force T97 as illustrated in FIG. 10.

Finally the first fasteners 88 and the second fasteners 90 are closed. The covering member 76 thereby forms a bag shape, thereby completing the seatback 15 as illustrated in FIG. 1. The headrest 99 is mounted to the upper end portion of the competed seatback 15. Furthermore, a reclining device (omitted in the drawings) provided to a rear end portion of the seat cushion 11 is connected to a bottom end portion of the left-right side frames 54. This thereby completes the seat 10 illustrated in FIG. 1.

Next, description follows regarding operation and advantageous effects of the present exemplary embodiment.

Figure 11:
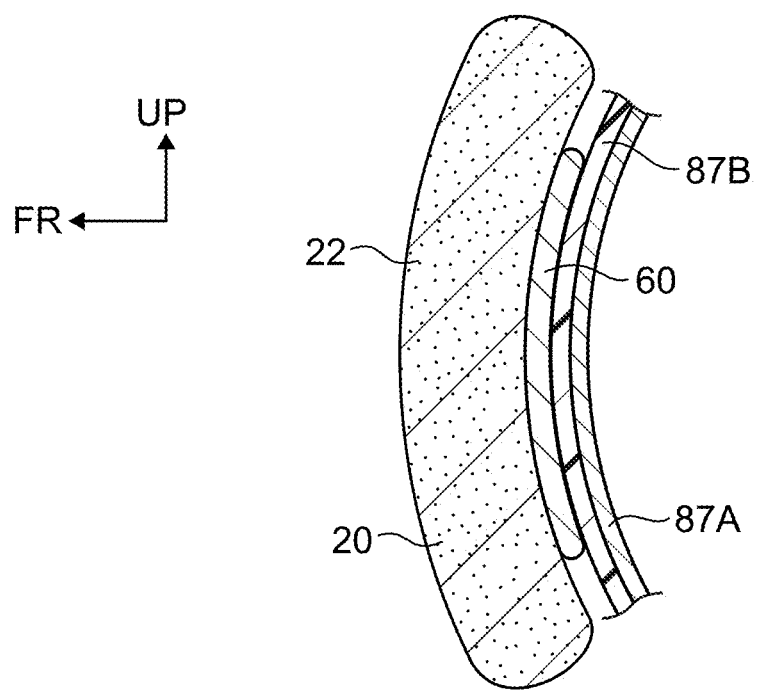
FIG. 11 is a schematic vertical side-view cross-section of a cushion member, a lumbar support, a base member, and a shock absorbing member.

For example, suppose there is a case in which the switch member has been operated by an occupant seated in the seat 10 including the lumbar support 60 having a side face profile formed in a substantially straight line shape, and the side face profile of the lumbar support 60 has been changed to the curved profile as illustrated in FIG. 11. When part of the lumbar support 60 is positioned further forward than other sites thereon in this manner, the central section 37 of the cushion member 20 then receives force from the lumbar support 60, and the left-right side sections 38 attempt to rotate in the arrow RW direction as illustrated in FIG. 5 with respect to side edge portions of the central section 37 that extend in the height direction. However, the covering member 76 (the front face side configuration sections 82 and the side face configuration sections 84), the first restraint members 92, and the second restraint members 95 restrain the corresponding side sections 38 while forming a ring shape. Furthermore, the back face restraint member 97 imparts a rearward acting tensional force T97 to the first restraint members 92. The side sections 38 attempt to rotate toward the opposite side to the arrow RW direction of FIG. 5 when this tensional force T97 reaches the side section 38 from the first restraint members 92. This means that the left-right side sections 38 are less liable to rotate relative to the central section 37 than in cases in which the covering member 76 is not provided with the first restraint members 92, the second restraint members 95, and the back face restraint member 97.

Furthermore, when the engaging portions 98 fixed to each of the back face restraint members 97 provided to the base member 87A are respectively connected to the intermediate engaging portions 94 fixed to the first restraint members 92, the base member 87A and the shock absorbing member 87B approach closer to the lumbar support 60 than cases in which the respective back face restraint members 97 are not connected to the intermediate engaging portions 94. In particular in the present exemplary embodiment, the back face restraint member 97 on the left side is connected to the right side edge portion of the first restraint members 92 on the left side, and the back face restraint member 97 on the right side is connected to the left side edge portion of the first restraint members 92 on the right side. This means that a left-right direction distance between the left-right engaging portions 98 and the lumbar support 60 is shorter than cases in which the back face restraint member 97 on the left side is connected to the left side edge portion of the first restraint members 92 on the left side and the back face restraint member 97 on the right side is connected to the right side edge portions of the first restraint members 92 on the right side. The shapes of the base member 87A and the shock absorbing member 87B accordingly more readily conform to the shape adopted by the lumbar support 60 whichever shape the side edge profile of the lumbar support 60 has adopted. This means that a large gap is not liable to be formed between the shock absorbing member 87B and the lumbar support 60.

Furthermore as illustrated in FIG. 10, the intermediate engaging portion 94, the back face restraint member 97, and the engaging portion 98 are positioned in the central recess 29. This means that there is little concern that part of the base member 87A bulges rearward due to the intermediate engaging portion 94, the back face restraint member 97, and the engaging portion 98 contacting the shock absorbing member 87B of the covering member 76.

Furthermore, the leading end engaging portions 93 and the engaging portions 96 are engaged at the back face recesses 40 formed to the rear face of the left-right side configuration sections 28. This means that there is less concern that part of the base member 87A bulges rearward due to the leading end engaging portions 93 and the engaging portions 96 contacting the shock absorbing member 87B than in cases in which the back face recess 40 is not formed to the side configuration sections 28.

Although an exemplary embodiment of the present disclosure has been described above, the present disclosure is not limited by this exemplary embodiment.

For example, the shock absorbing member 87B may be omitted from the back face configuration section 86 of the covering member 76.

The back face configuration section 86 may deform together with the deformation of the lumbar support 60 such that the back face configuration section 86 does not contact the lumbar support 60.

Moreover, the leading end engaging portions 93 and the engaging portions 96 may be differently shaped to the illustrated shapes as long as they are shapes that enable engagement with each other. Similarly, the intermediate engaging portions 94 and the engaging portions 98 may be differently shaped to the illustrated shapes as long as they are shapes that enable engagement with each other.

The drive device 65 may be a manual drive device not equipped with an actuator.

What is claimed is:

1. A seatback of a vehicle seat, the seatback comprising:
   a cushion member including a seat width direction central section, and a pair of side sections respectively connected to a pair of side edge portions of the central section so as to be rotatable relative to the central section about the side edge portions;
   a lumbar support configured to contact a rear face of the central section and to be deformable such that a front-rear direction position of part of the lumbar support is changed;
   a covering member having a bag shape and covering the cushion member and the lumbar support;
   a pair of side restraint members configured so as to be connected to an inner face of the covering member and to respectively restrain the pair of side sections; and
   a pair of back face restraint members provided at an inner face of a back face configuration section of the covering member and, by being respectively connected to the pair of side restraint members, configured to cause the back face configuration section to approach closer to the lumbar support than would be the case were they not to be connected to the side restraint members.

2. The seatback of the vehicle seat of claim 1, wherein the back face restraint member on the left side is connected to a right side edge portion of the side restraint member on the left side restraining the side section, and the back face restraint member on the right side is connected to a left side edge portion of the side restraint member on the right side restraining the side section.

3. The seatback of the vehicle seat of claim 1, wherein:
   first recesses are provided at a rear face of the central section and are positioned between the pair of side sections and house the lumbar support; and
   connection portions between the left-right back face restraint members and the side restraint members are positioned in the respective first recesses.

4. The seatback of the vehicle seat of claim 1, wherein:
   a left-right pair of through holes are provided at the central section so as to penetrate the central section;
   the side restraint members each include a first restraint member having one end portion connected to the inner face of the covering member and having another end portion provided with a first engaging portion, and a second restraint member having one end portion connected to the inner face of the covering member and provided with a second engaging portion engageable with the first engaging portion at another end portion; and
   the first engaging portions of the first restraint members are passed through the through holes toward the rear from in front of the cushion member, and are engaged with the second engaging portions of the second restraint members that contact a rear face of the side section.

5. The seatback of the vehicle seat of claim 4, wherein:
   a second recess is formed at a rear face of each of the left-right side sections; and
   the first engaging portions and the second engaging portions are engaged in the second recesses.

* * * * *